United States Patent [19]

Reed

[11] Patent Number: 4,577,130
[45] Date of Patent: Mar. 18, 1986

[54] PANCAKE MOTOR WITH INSITU WOUND BOBBINLESS STATOR COILS

[75] Inventor: Frank R. Reed, Mt. Laurel, N.J.

[73] Assignee: RCA Corporation, Princeton, N.J.

[21] Appl. No.: 612,428

[22] Filed: May 21, 1984

[51] Int. Cl.[4] ............................................. H02K 3/00
[52] U.S. Cl. .................................... 310/194; 310/214; 310/268
[58] Field of Search ............. 310/156, 268, 254, 49 R, 310/42, 43, 45, 68 R, 194, 214, DIG. 3, DIG. 6

[56] References Cited

U.S. PATENT DOCUMENTS

| | | | |
|---|---|---|---|
| 3,549,926 | 12/1970 | Pentland | 310/194 |
| 4,135,120 | 1/1979 | Hoshimi et al. | 318/138 |
| 4,203,048 | 5/1980 | Sato | 310/268 |
| 4,220,879 | 9/1980 | Hoshimi et al. | 310/68 R |
| 4,292,557 | 9/1981 | Kishi | 310/268 X |
| 4,336,475 | 6/1982 | Morinaga et al. | 310/45 X |
| 4,429,240 | 1/1984 | Kishi | 310/DIG. 6 |
| 4,455,516 | 6/1984 | Furusho | 310/268 X |

FOREIGN PATENT DOCUMENTS

| | | |
|---|---|---|
| 0130764 | 8/1983 | Japan ............... 310/DIG. 6 |
| 1362141 | 7/1974 | United Kingdom . |
| 1574301 | 9/1980 | United Kingdom . |
| 2074393 | 10/1981 | United Kingdom . |
| 1602554 | 11/1981 | United Kingdom . |

OTHER PUBLICATIONS

"Application of Porcelain Steel Substrate Thick Film Circuits in Japan" N. Suzuki, K. Yajima, S. Murayama, M. Itah, abstract of paper to be presented at meeting of International Society for Hybrid Microelectronics, ISHM '84, Dallas, Texas.

Primary Examiner—Mark O. Budd
Attorney, Agent, or Firm—P. J. Rasmussen; P. M. Emanuel; R. G. Coalter

[57] ABSTRACT

The stator of a pancake motor comprises porcelianized steel with stator coils secured thereto by means of raised tabs which "entrap" a few turns of the coil between the tab and the surface of the stator. Thermoplastic insulation on the wire, when heated, rigidly bonds the coil turns together thereby gripping the tabs and securing the coils to the stator surface. Coil connections are provided by printed wire patterns on the stator surface. Since the stator coils may be wound insitu, bobbins, fasteners and printed wiring boards are eliminated, assembly steps are reduced, and both convective and conductive heat dissipation are improved thereby reducing the motor cost, improving its reliability and allowing the motor to run cooler or to provide more power output for a given temperature increase.

13 Claims, 8 Drawing Figures

PANCAKE MOTOR WITH INSITU WOUND BOBBINLESS STATOR COILS

FIELD OF THE INVENTION

This invention relates to the formation of a coil on a plate having an electrically non-conducting coating that may be used in stator assemblies of motors and particularly of brushless, slotless, axial-field, permanent magnet motors commonly called "pancake" motors because of their relative flatness in the axial dimension.

DESCRIPTION OF THE PRIOR ART

The low profile feature of pancake motors is advantageous both for purposes of styling (e.g., low silhouette phonograph turntables or video disc players) and for purposes of practical utility as, for example, in the case of floppy disc drives where it may be desired to mount two "slim" drives in a space originally intended for only one drive. Another space limited application well suited to the use of compact pancake motors is in video tape recorders (for headwheel, reel and capstan drives).

Pancake motors are well known, an exemplary one being described by Hashimi et al. in U.S. Pat. No. 4,220,879 which issued Sept. 2, 1980. The Hashimi et al. motor is quite compact owing partly to the fact that the stator printed wiring board is disposed between the stator coils (rather than being underneath them). However, the overall stator assembly is relatively complex and includes a number of items requiring sub-assembly. The stator coils (four), for example, are wound on "winding blocks" (i.e., bobbins) which are secured to the base plate of the stator by screws. In addition to complicating assembly of the motor, the use of coil bobbins undesirably increases the axial dimension of the motor and decreases thermal efficiency.

SUMMARY OF THE INVENTION

The present invention pertains to the formation of a coil on a plate in a manner which may advantageously be employed to substantially simplify the construction of pancake motors and, in particular, to eleminate the need for bobbins in the finished stator assembly so as to reduce the axial dimension of the stator assembly, to provide improved cooling and also to reduce the number of steps required to assemble the various motor components. Specifically, in accordance with the invention, a coil location on a plate is provided with at least one raised tab having an offset bend. A coil is secured to the plate by entrapment of a number of turns of the coil between the tab and the surface of the plate. The principles of the present invention may advantageously be applied to brushless, slotless axial field motors of the type having a stator assembly comprising a flux return plate comprising a magnetic material having a conformal, electrically non-conducting coating with stator coils mounted thereon.

DETAILED DESCRIPTION

Figure 1:
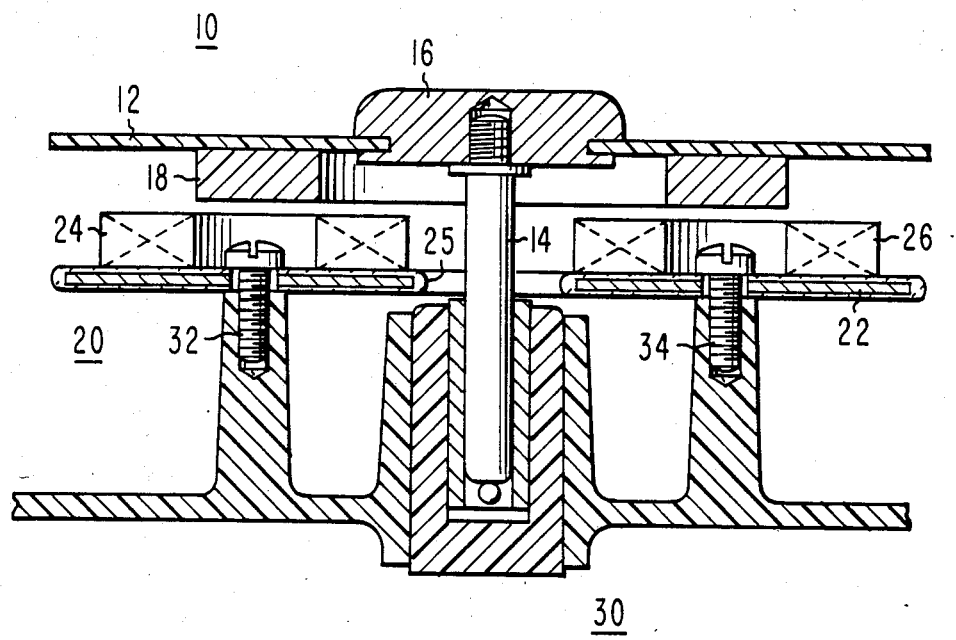
FIG. 1 is a cross-sectional view along the axis of a pancake motor embodying the invention.
Figure 5:
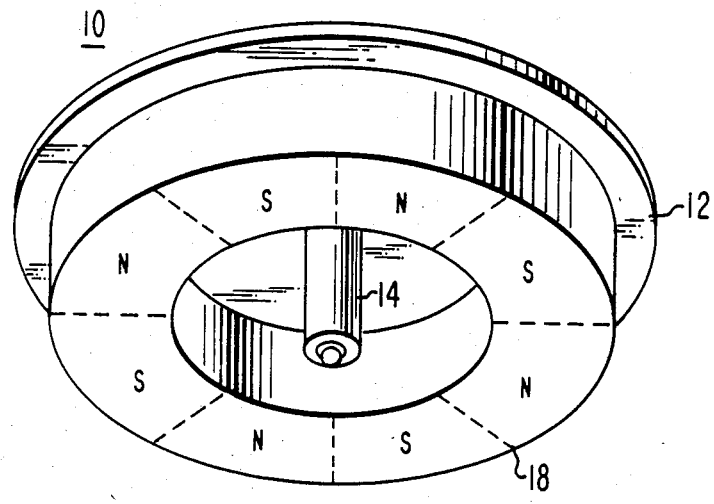
FIG. 5 is a perspective view of the magnet side of the rotor assembly of the motor of FIG. 1.

FIG. 1 illustrates a preferred configuration of a motor constructed in accordance with an aspect of the present invention for use in audio or video disc player applications. Here, the rotor assembly 10 includes a rotor plate 12 having a rotor shaft 14 attached thereto by means of a record (or disc) centering hub 16 whereby the rotor assembly of the motor also serves as the player turntable with the hub 16 providing record centering and retention. The rotor assembly includes an axially poled ring magnet 18 attached (by adhesive) to the bottom of the rotor plate 12 for imparting rotational energy to the rotor assembly. The perspective view of the rotor assembly 10 of FIG. 5 illustrates the poling of ring magnet 18. In this example of the invention, magnet 18 is poled in eight segments of alternating polarity as is the common practice in certain video and audio disc player motors. In a known video disc player the rotor plate 12 is of non-magnetic material (plastic). For increased torque, plate 12 may be of a magnetic material (steel).

The stator assembly 20 of the motor comprises a flux return plate 22 having stator coils 24, 26 mounted thereon in accordance with an aspect of the invention as will be described in detail subsequently. The remaining portion of the motor comprises a bearing assembly (indicated generally as 30) which is attached to the flux return plate by screws 32, 34. Bearing assembly 30 receives the shaft 14 (which passes through a centrally located hole 25 in the flux return plate) and positions rotor plate 12 parallel to the flux return plate 22. Bearing assembly 30 is of conventional design (as well as rotor assembly 10) and so will not be described in further detail here. Motors having such rotor and bearing assemblies are used, for example, in certain video disc players such as the model SJT-400 player manufactured by RCA Corporation.

Figure 2:
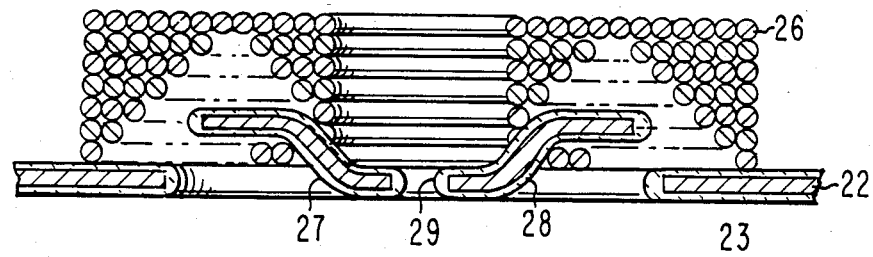
FIG. 2 is a detail drawing of a portion of the motor of FIG. 1.

FIG. 2 presents details of the coil mounting on the stator assembly of FIG. 1. As shown, the flux return plate 22, conformally coated with an electrically non-conducting coating 23, has raised tabs 27 and 28. Preferably, the plate is steel and the coating is porcelain. A suitable procelain is described in U.S. Pat. No. 4,256,796 of Hang et al. which issued Mar. 17, 1981, and is incorporated herein by reference. Each tab has an offset bend for capturing coil wire underneath. In this example of the invention, the distance between the offset tab and the surface of the conformally coated flux return plate is selected to be equal to the diameter of the coil wire. This specific dimensional feature has been discovered to yield minimum "cogging" effects in the motor operation. The term "cogging", as is known in the art, refers to variations in torque as a function of rotational position. It has been found that the tabs, having a magnetic core do tend to distort the magnetic field somewhat and that cogging becomes a problem in motors intended for critical constant rotational velocity applications (e.g., disc or tape drives) due to such non-uniform distortions with respect to the rotor magnetic circuit (a planar ring magnet). However, it is herein recognized that the problem of field distortion can be minimized by keeping the restraining tab (27, 28) profile relatively low. By "low" it is meant that the tab "captures" or "entraps" only a few turns of one or two layers (one being shown) of the stator coil 26.

Tab mounting of the stator coils, as shown in FIG. 2, has two very significant advantages. Firstly, it completely eliminates the need for a separate coil assembly step (in which the coils are first wound and then attached to flux return plate 22) because the coils may be wound insitu as will be described. Secondly, the coil requires no bobbin in the finished assembly. This reduces the axial (i.e., height) dimension of the motor by the thickness of the top and bottom retaining portions of the bobbins. Elimination of bobbins also improves heat dissipation of the motor both by convection (there is no bobbin wall to shield the coil from wind generated by the rotor) and conduction (there is no bobbin wall between the coil wire and plate 22).

Figure 3:
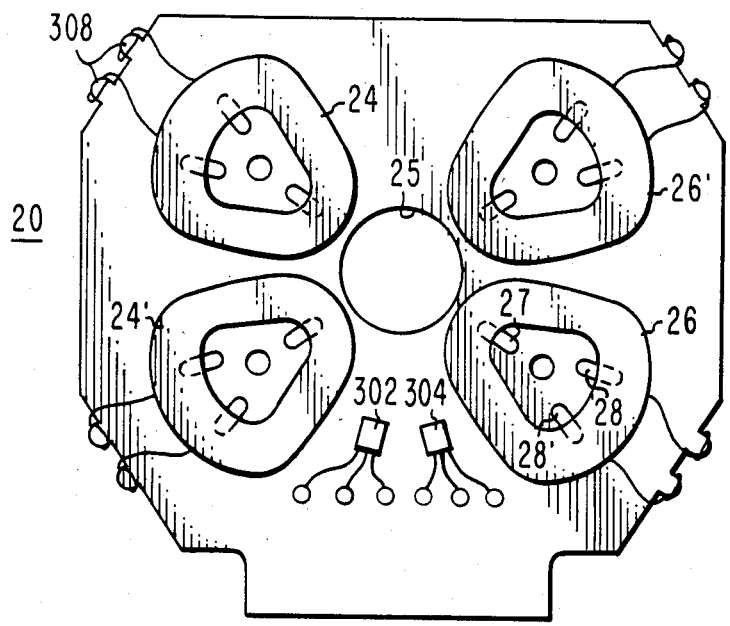
FIGS. 3 and 4 are top and bottom plan views, respectively, of the stator assembly of the motor of FIG. 1.
Figure 8:
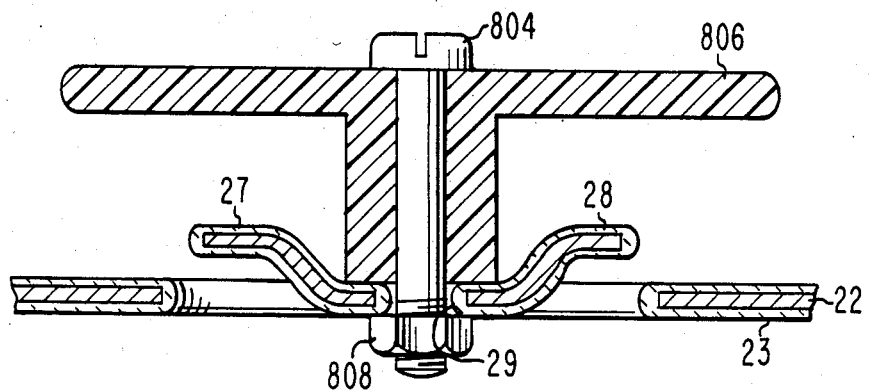
FIG. 8 is a sectional view of a portion of the stator assembly of the motor of FIG. 1 illustrating placement of the mandrel for facilitating insitu winding of a stator coil in accordance with an aspect of the invention.

FIG. 8 illustrates the method of winding coil 26 (typical of all the coils) insitu on the flux plate. In FIG. 8, the coil location (also FIG. 2) is provided with a centrally located hole 29. This hole has dual functions. It may be used for ultimately mounting the motor to the bearing assembly as shown in FIG. 1. Its more important function is for receiving a bolt 804 which secures a mandrel 806 to the stator assembly 20 during winding of the stator coil 26. The bolt 804 is provided with a nut 808 temporarily during winding which fixes the mandrel 806 to the coil location. As the wire is wound, it is retained by the sidewalls of mandrel 806 and the inside shape of the coil is determined by the shape of the mandrel central core. The mandrel core is substantially "wedge" shaped (as indicated by the coils shown in plan view in FIG. 3) and has rounded corners. As the coil is wound (insitu) some of the coil turns are entrapped or captured between the tabs (27,28) and the planar surface of the flux plate. After winding, an electric current is passed through the coil causing it to heat. The coil wire is double insulated with the outer insulation coating being of thermoplastic material. The heat causes the various turns of wire to "fuse" or to adhere to adjacent turns. The coil is then allowed to cool and then the mandrel is removed. This process of winding, heating, cooling and mandrel removal may be performed on all coils simultaneously (the illustrated motor has four coils as shown in FIG. 3) thereby vastly simplifying the stator assembly as compared with the prior art approach of winding coils on bobbins and then attaching the bobbins to the flux return plate by means of screws. The need for fasteners (screws or rivits) or glueing as well as bobbins is eliminated, and the associated assembly steps are eliminated. In addition, the axial length (height) of the motor is reduced by the thickness of the top and bottom portions of the bobbins. The double insulated wire may be of the same type used in winding television deflection yokes where heating is also used, after winding, for fusing the coil to retain its shape.

FIG. 3 is a top view of the stator assembly 20 illustrating the mounting position of four stator coils 24, 24', 26 and 26' and of a pair of Hall effect sensors 302 and 304. The Hall sensors provide angular velocity and position sensing for the motor. The angular position of the coils and sensors with respect to the rotor shaft hole 25 is conventional (see, for example, U.S. Pat. No. 4,202,879 previously discussed). Of principal concern is that three tabs (27,28,28', typically) are provided for each coil location.

The use of three tabs has been discovered to be optimum for (1) securing the coils to the plate, (2) minimizing cogging and (3) retaining the inside shape of the coils during winding. Increasing the number of tabs places more iron within the coil location and therefore increases the tendency of the motor to cog. However, more tabs may be used in applications requiring high shock resistance. Fewer tabs provide little coil shaping and weaker coil retention.

Figure 4:
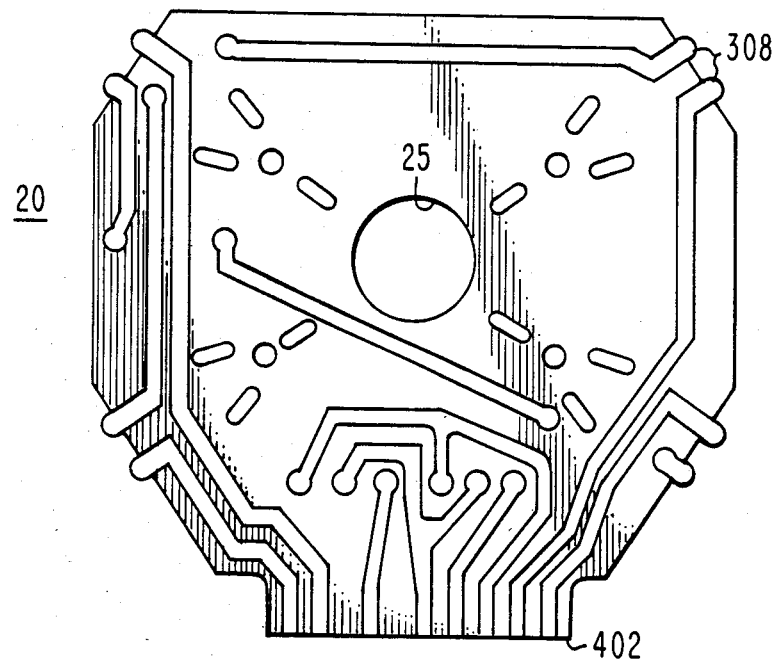

FIG. 4 illustrates a printed wire pattern formed on the bottom side (opposite the coil side) of the stator assembly for connecting the coils and Hall sensors to a connector area 402 of the stator assembly. The printed conductors may be applied to the assembly by conventional means such as silk screening silver ink on the ceramic overcoat of the flux plate and then "firing" (heating) the ink to a temperature sufficient to displace the silver carrier and fuse the silver. Such processes for printing conductors on porcelain are quite well known (see, for example, U.S. Pat. No. 4,415,624 of Prabhu et al. entitled "Air-Firable Thick Films" which issued Nov. 15, 1983 and is incorporated herein by reference). Of importance to the present invention is (as shown in FIG. 3) that the stator assembly is a unitary structure providing the triple functions of (1) holding the coils, (2) providing a flux return path and (3) providing a printed circuit substrate.

In this connection it is instructive to note that whereas silver ink may be adhered easily to the porcelain surface, no suitable adhesive has been found which will reliably stick to it so as to enable the stator coils to be simply glued to the flux return plate. It is only by means of tabular mounting, in accordance with the invention, that one may gain the triple benefits in one unitary structure as noted above.

The "dimples" (308 generally) at the edges of the flux plate 20 in FIGS. 3 and 4 are provided for connection of the coil windings (FIG. 3) to the printed circuit conductors (FIG. 4). The printed circuit conductors extend to the underside of each dimple. After the coils are wound, the ends of the coil wire are stripped of insulation and wound around the dimples. The leads of the Hall effect sensors are pushed through the holes provided therefore in the flux return plate. The permanent electrical connections may be made by wave soldering the conductor side of the stator assembly. This single step forms all electrical connections of the stator assembly simultaneously.

Figure 6:
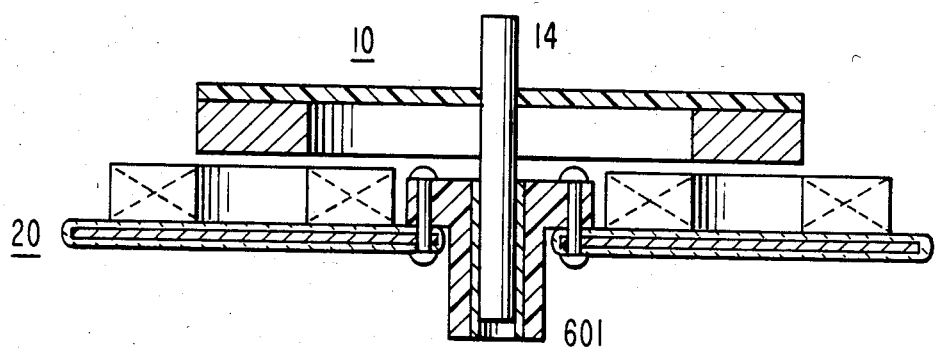
FIG. 6 is a simplified drawing illustrating a modification of the motor of FIG. 1.

FIG. 6 illustrates a variation of the motor of FIG. 1, wherein a bearing 601 is rivited directly to the stator assembly 20. This reduces the axial length of the motor. Also shaft 14 is shown to be extended beyond the surface of the rotor assembly 10 for providing torque to a load (not shown). This motor configuration may be used, for example, in video tape recorder applications where shaft 14 rotates the VTR headwheel, or the capstan drive. Another application would be for floppy (or hard) disc drives.

Figure 7:
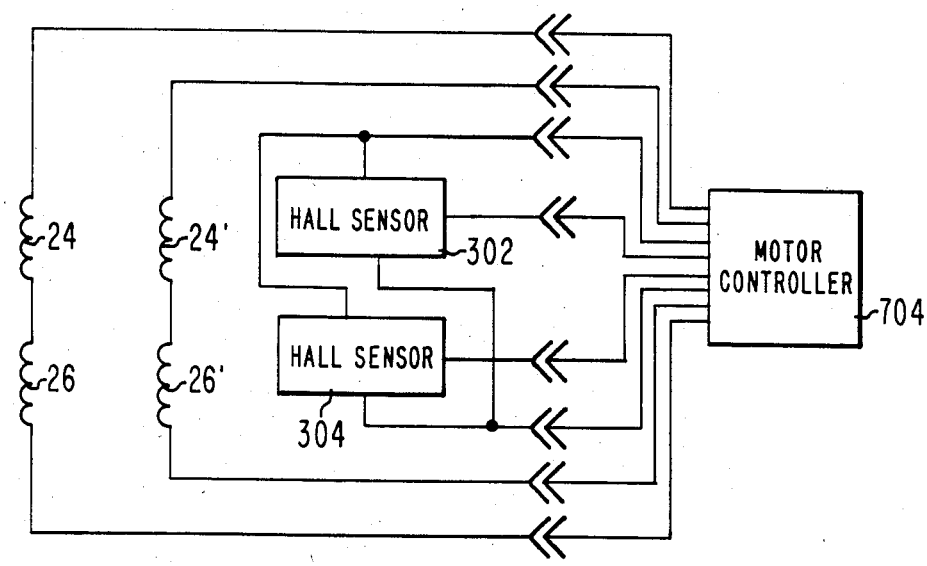
FIG. 7 is a schematic diagram of the printed wiring pattern of FIG. 4.

FIG. 7 is a schematic diagram of the printed wire pattern shown in FIG. 4. The stator coils 24 and 26 and coils 24' and 26' are series connected. The Hall elements have parallel connected supply and ground lines and separate outputs. All connections, as in FIG. 4 are brought to a connector 702 which couples the coil and sensor leads to a motor controller 704. Suitable controllers are well known, one example being described in U.S. Pat. No. 4,135,120 Hashimi et al. which issued Jan. 16, 1979 and is incorporated herein by reference. Motor controller 704 receives position and velocity information from the Hall sensors and supplies energy to coils 24, 24', 26, 26' for causing rotation of the rotor assembly 10 in known manner.

Although the invention has been illustrated in the context of a pancake motor application, the principles of the invention are of general utility and may be applied to other electro-magnetic devices such as relays or acoustic transducers (e.g., loudspeakers, sonar projectors, etc.).

What is claimed is:

1. In a pancake motor of the type having a stator assembly comprising a flux return plate with stator coils mounted thereon, the improvement characterized in that:
   (a) said flux return plate comprises a magnetic material having a conformal, electrically non-conducting, coating;
   (b) each stator coil location on said flux return plate is provided with at least one raised tab having an offset bend, each said tab being integral with said plate; and
   (c) each stator coil is secured to said flux return plate by entrapment of a number of turns of the coil between the tab and the surface of said flux return plate and wherein the entrapped turns are fused to the remaining turns.

2. A motor as recited in claim 1 further comprising wiring means for providing electrical connections to said stator coils, said wiring means comprising at least one printed circuit conductor disposed on said conformal electrically non-conducting coating of said flux return plate.

3. A motor as recited in claim 2, wherein said wiring means is disposed on the side of said flux return plate opposite said coil location.

4. A motor as recited in claim 1, wherein said motor includes a rotor having a rotor shaft and wherein said flux return plate includes a hole centrally located between said coil locations for receiving a portion of said rotor shaft.

5. A motor as recited in claim 1, wherein said flux return plate includes a hole centrally located within each coil winding area.

6. A motor as recited in claim 1, wherein:
   said magnetic material of said flux return plate comprises steel; and wherein
   said coating comprises porcelain.

7. A motor as recited in claim 1, wherein the offset bend in each tab is spaced from said flux return plate by a distance substantially equal to the diameter of the coil wire.

8. A motor as recited in claim 1, wherein the wire of each coil is double insulated, the outside insulated layer being thermoplastic and wherein the turns of each coil are adhered together by fusing of the thermoplastic insulation.

9. In an axial field motor of the type comprising a rotor assembly having a rotor plate with a rotor shaft attached thereto for rotating said plate and an axially poled ring magnet attached to said plate in concentric alignment with said shaft, said motor including a stator assembly comprising a flux return plate having stator coils mounted thereon, in respective locations, said motor having bearing means attached to said flux return plate for receiving said shaft and positioning said rotor plate parallel to said flux return plate, the improvement wherein:
   (a) said flux return plate comprises a ferrous metal conformally coated with porcelain and having at least one printed circuit conductor disposed thereon for providing electrical connection to at least one of said stator coils;
   (b) each stator coil location on said flux return plate is provided with at least one raised tab having an offset bend, each said tab being integral with said plate;
   (c) each stator coil is secured to said flux return plate by entrapment of a number of turns of the coil between the tab and the surface of said flux return plate; and
   (d) each coil having double insulated wire, the outside insulated layer being thermoplastic, the entrapped turns and, the remaining turns of each coil being adhered together by fusing of the thermoplastic insulation.

10. In combination:
   a plate having an area thereon for receiving a coil, said plate comprising a magnetic material having a conformal, electrically non-conducting coating, said area being provided with at least one raised tab integrally formed from said plate and having an offset bend, said coil being secured to said plate by entrapment of a number of turns of the coil between the tab and the surface of the plate, said coil having thermoplastic insulation, the entrapped turns and the remaining turns of said coil being adhered together by fusing of the thermoplastic insulation.

11. The combination as recited in claim 10, wherein said plate comprises a ferrous metal, said coating comprises porcelain and further comprising at least one printed circuit conductor disposed on said plate for making electrical connection to said coil.

12. The combination recited in claim 10, further comprising a hole in said plate centrally located within said area for receiving a coil winding mandrel.

13. The combination recited in claim 10, wherein the offset bend in said at least one tab is spaced from said plate by a distance substantially equal to the diameter of the coil wire.

* * * * *